Jan. 5, 1960   A. W. TRONNIER   2,919,623
VIEWFINDER FOR PHOTOGRAPHIC CAMERAS
Filed June 20, 1956   2 Sheets-Sheet 1

INVENTOR
ALBRECHT WILHELM TRONNIER
BY Mocks&Blum
ATTORNEYS

Jan. 5, 1960 A. W. TRONNIER 2,919,623
VIEWFINDER FOR PHOTOGRAPHIC CAMERAS
Filed June 20, 1956 2 Sheets-Sheet 2

INVENTOR
ALBRECHT WILHELM TRONNIER

BY
Mock & Blum
ATTORNEYS

2,919,623

VIEWFINDER FOR PHOTOGRAPHIC CAMERAS

Albrecht Wilhelm Tronnier, Gottingen, Germany, assignor to Voigtlander A.G., Braunschweig, Germany, a corporation of Germany Application June 20, 1956, Serial No. 592,610

Claims priority, application Germany July 9, 1955

3 Claims. (Cl. 88—1.5)

This invention relates to a view finder for photographic cameras and it has particular relation to view finders into the path of rays of which a frame for inclosing the image field is reflected by a mirror.

In a known view finder, laterally from the outlook opening, a mask is arranged which carries a transparent frame on a non-transparent base. Over a semi-permeable mirror arranged in the path of rays of the view finder and an additional mirror, said frame is visible in the view finder and incloses the image field of the finder.

Photographic cameras have also been known, in the image field of the view finder of which the distance at which the camera objective is sharply focused in each case, is indicated. This is attained by a graduated disc which is connected with the objective, and projects into the field viewed in the finder. It has likewise been suggested to project such distance scales over mirrors into the path of rays of view finders.

The main object of the present invention consists in providing a view finder of the above mentioned type, in which—in independence on the adjustment to distance of the camera objective—into the path of rays forming the image of the above mentioned frame, means can be inserted in order to indicate the distance adjustment of the objective in the image of the finder in each case.

Other objects and the advantages of the invention will be apparent from the following specification and the appended claims and drawings.

The arrangement according to the present invention has the advantage that the conventional mirrors which are present anyhow in the view finder for rendering the image-enclosing frame visible, can be utilized, simultaneously for reflecting the means for indicating the adjusted distance. No additional members or elements are therefore necessary in the view finder so that the construction is simple and inexpensive and requires little space only in the view finder.

It has been found to be of particular advantage to use for indicating the adjustment to distance of the objective, means by which the image-enclosing frame, or parts thereof, are caused to appear colored. Thereby, the various colors of the image-enclosing frame indicate a specific adjustment of distance or a specific range of distance. In carrying out the invention it is preferred to insert glasses, filters or transparent foils of various colors in the path of rays for producing a colored image of the image-enclosing frame, in dependence on the adjustment to distance of the objective.

View finders embodying the present invention can be used with particular advantage in cameras in which the objective is adjustable not to specific distances, but to conventional distance ranges, such as "portrait," "group," "landscape." For example, in adjusting the objective to the range "portrait," a glass of bright orange color can be inserted into the path of rays for producing the image of the image-enclosing frame. Upon adjusting the objective to the distance range "group," the orange colored glass is removed from the path of rays, and in this particular adjustment, a colorless image-enlcosing frame appears in the view finder. Upon adjusting the objective to the distance range "landscape," for example, a green colored glass is inserted into the path of rays for producing the image of the image-enclosing frame. Thus, the three distance ranges of such a camera can be indicated in the finder image by two glasses of different colors.

According to a modification of the present invention, the colored glasses are inserted in the path of rays in such a manner that only parts of the image-enclosing frame or only certain portions of the image field visible in the view finder appear in color, in order to indicate various adjustments to distance of the objective.

In order to attain this, one or more light-permeable areas can be provided at any desired point of the generally light-impermeable portion of the mask which carries the image-enclosing frame and the colored glasses, foils or the like, can be inserted in the range of such light-permeable portions in dependence on the adjustment to distance of the objective. Such light-permeable surface, which may be of circular or any other suitable shape, can be located in the middle of the mask, so that in viewing the finder, said surface appears in the middle of the image field. However, the light-permeable surface or surfaces can be provided also in other parts of the mask so that such surfaces appear at the periphery of the image field or in a corner of the image field. One or more of such light-permeable surfaces can be provided in the mask.

In the appended drawings, which illustrate by way of example and without limitation some embodiments of and best modes for carrying out the invention:

Figure 1:
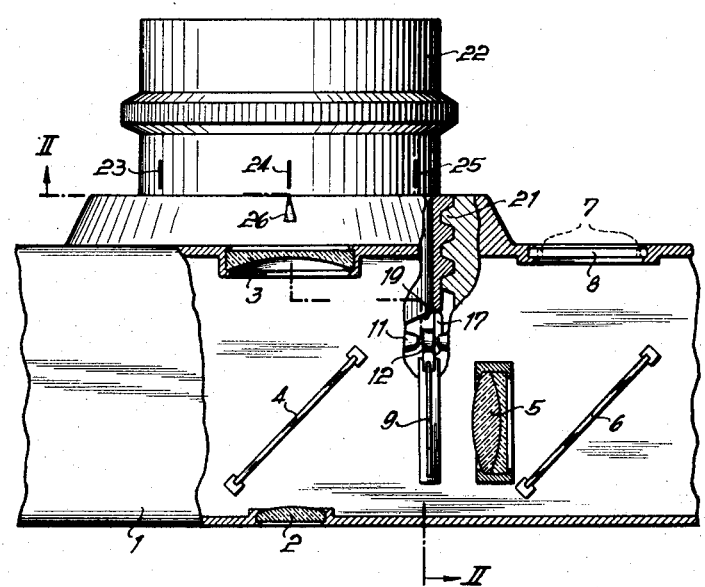
Fig. 1 is a top view of a photographic camera in which the cap of the view finder casing is partly broken away.

Referring now to the drawings in detail, in Fig. 1 reference symbol 1 denotes a photographic camera, in which the cap covering the view finder casing is partly broken away so that the lenses carried by the walls of the casing, i.e., the finder ocular 2 and the finder objective 3 are visible. In the path of rays between lenses 2 and 3 a semi-permeable mirror 4 is arranged, which—over a lens member 5 and a mirror 6—deflects the rays from a light-permeable frame 7 of a light-impermeable mask 8, into the path of rays of the view finder. Thus, upon looking through the finder, the image-enclosing frame 7 is also visible.

Figure 2:
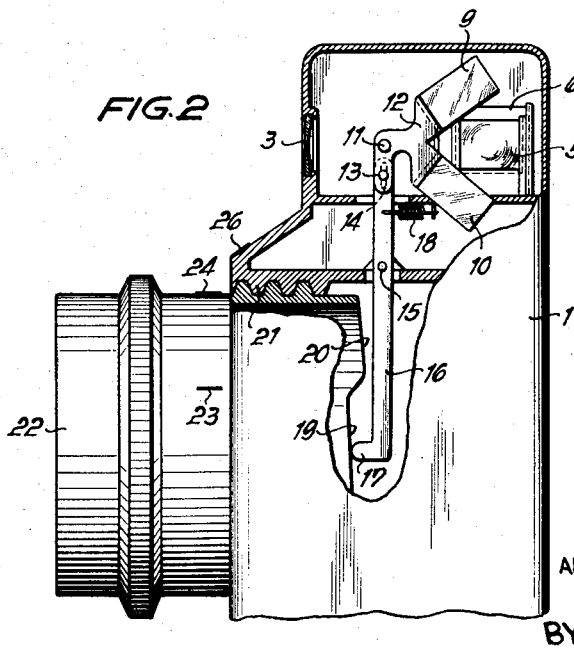
Fig. 2 is a side view of the camera shown in Fig. 1, along the line A—B in Fig. 1.

In order to indicate the adjustment to distance of the camera objective in the finder image in each case, in the embodiment shown in Figs. 1 and 2 in the path of rays for producing the image of frame 7, colored glasses 9 and 10 can be inserted. These glasses are carried by a rocker arm or tipping lever 12, which is pivoted at 11. A bolt 13 is fastened to the free end of said lever 12. This bolt 13 engages a longitudinal slot 14 of a contact lever 16, which is pivoted at 15. This lever 16 lies, under the effect of a spring 18, with its contact piece 17, against the front cams 19 and 20 of the camera objective 22 which is adjustable by screw threads 21. The objective 22 can be adjusted by means of marks 23, 24 and 25 relative to a stationary mark 26, whereby upon adjustment to mark 23, a near range (portrait), upon adjustment to mark 24, a middle range (group), and upon adjustment to mark 25, a distant range (landscape) are sharply reproduced on the light sensitive layer of the camera. It is of advantage to provide on the objective 22 stop means which become effective at the three points of adjustment.

In the position shown in Figs. 1 and 2, the objective 22 is adjusted to the mark 24, i.e., to the middle range of distance. Thereby, as shown in Fig. 2, lever 12 is in a position in which neither of colored glasses 9 and 10 is in the path of rays from the frame 7. Therefore, in this case, frame 7 appears colorless in the finder.

Upon adjustment of the objective 22 to the mark 23, contact lever 16 is caused by cam 20 to swing. Thereby it causes lever 12 to move in such a manner that colored glass 9 becomes inserted in the path of rays and the entire frame 7 becomes visible in a corresponding color in the finder. Upon adjusting the objective to mark 25, a corresponding front cam provided on objective 22 causes insertion of colored glass 10 into the path of rays from frame 7.

Marks 23 and 25 have preferably the same color as the coordinated colored glasses 9 and 10, respectively.

Figure 3:
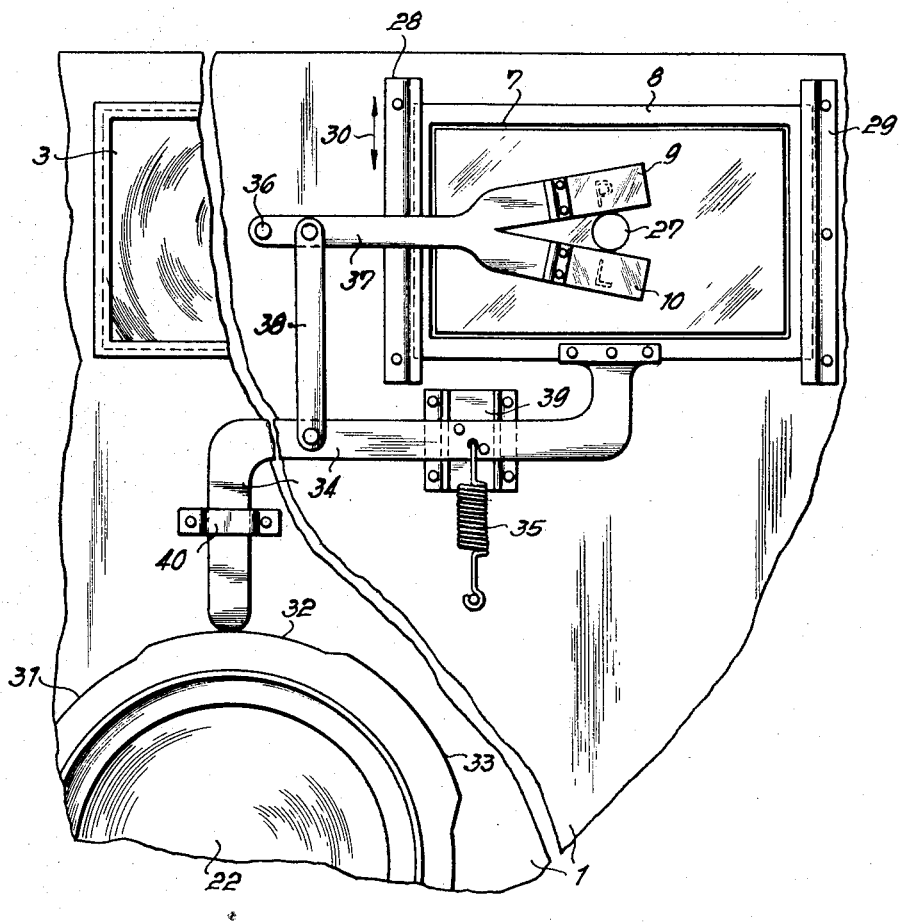
Fig. 3 illustrates another embodiment of an image-enclosing mask viewed from the interior of the camera.

In the embodiment illustrated in Fig. 3, not the entire image-enclosing frame, but only a part of the image field is caused to appear colored or colorless in dependence on the adjustment of the objective. Thereby, the adjustment of the objective in each case can be indicated also by means other than colors.

In Fig. 3 the mask 8 which carries the light-permeable frame 7, has a light-permeable portion 27 in its otherwise light-impermeable part. Said portion is here shown, by way of example, in the center of mask 8. Mask 8 is displaceable in the directions indicated by arrow 30 by means of rails 28 and 29 fastened to the camera casing 1, in order to obtain parallax compensation. Such displacement of the mask 8 is imparted thereto in dependence on the adjustment of the objective 22. The objective mount is provided with radially projecting cam portions 31, 32 and 33 which are engaged by a contact piece 34 which is connected with mask 8 and lies against said cam portions under the effect of a spring 35. Reference symbols 39 and 40 denote guide and holding means fastened to the camera wall 1, for the contact member 34. Above the objective 22 the finder objective 3 is shown. In this position of finder objective 3 relative to camera objective 22, merely a vertical parallax occurs which can be compensated for by corresponding movement of the mask 8 with frame 7.

A lever 37 is pivoted about pivot 36 fastened to the wall of the camera casing, and said lever 37 is preferably made of a light-permeable material in order to avoid interruption of frame 7. Colored glasses 9 and 10 are applied to the free end of lever 37, the latter being connected with contact member 34 by means of a control lever 38. Displacement of member 34 causes swinging of lever 37. In the example shown in Fig. 3, contact member 34 lies against the surface of cam piece 32 which is coordinated to adjustment of the objective to a middle range of distance (group). Upon looking through the finder, merely the colorless frame 7 is visible. Upon adjusting the objective by rotation to a near range (portrait), cam piece 31 will be located below contact member 34, whereby the mask 8 is displaced by an amount adapted to compensate for parallax. Simultaneously, contact lever 38 causes swinging of lever 37, whereby colored glass 9 enters the range of light-permeable portion 27. Upon looking through the finder in the image field limited by the colorless frame 7, a circular colored portion (the color of which corresponds to that of glass 9) will be visible in the center of the image field. Upon adjusting the objective to the distant range (landscape), colored glass 10 enters the range of light-permeable field 27.

Portion 27 in Fig. 3 can be of circular shape or any other desired shape and can be arranged in any part of the non-transparent surface of mask 8. It is then merely necessary to change the dimensions of lever 37 correspondingly. Furthermore, if no displacement of the mask 8 for compensation of parallax is provided for, movement of the lever 37 can be brought about by having control lever 38 lying directly against cam portions 31, 32 and 33.

In the examples shown, the insertion and removal of the colored glasses is effected by control cams which are arranged directly on the objective mount. However, it is within the scope of the present invention to derive the movements of the colored glasses from other distance adjusting means, for example, to derive them from a button or for adjustment of the distance, which is arranged on the camera body.

The invention is not limited to the use of two colored glasses and the number of colored glasses is determined in dependence of the ranges of adjustment of the camera objective or the number of marked values of the scale for adjustment of the distance.

In the examples described above the colored glasses are inserted by a swinging movement in the path of rays. However, other arrangements for insertion and removal of the colored glasses in and from the path of rays can also be employed in carrying out the invention. For example, the colored glasses can be inserted in and removed from the path of rays by a sliding movement. Furthermore, a rotating disc provided with sectors of different colors can be used, the sectors of which are inserted in the path of rays in dependence on the adjustment of the objective, by rotation of said disc. A band composed of differently colored portions, which is adapted to be inserted in the path of rays for producing the image of the image-enclosing frame, can be also used. Such band can be coupled with the means for adjusting the distance in such a manner that upon adjustment to a predetermined distance or distance range, a band portion coordinated with the latter becomes located in the path of rays.

In addition to the indication by colors, a reference symbol can be additionally used for indicating the distance ranges. Such reference symbol may, for example, consist of a letter used as an abbreviation. For example, colored glass 10 in Fig. 3 could be marked by the letter "L" (landscape) so that upon insertion of colored glass 10, said letter "L" also appears in the light-permeable field 27 and is visible in the finder image. Correspondingly, the letter "P" (portrait) should be then applied to colored glass 9.

It will be understood that in addition to letters, numbers or other symbols can be likewise used for indicating the adjusted distance or distance range. If such letters, figures or other symbols are used, the indication by color can be dispensed with so that only the reference symbols are used for indication of the objective adjustment in the finder image.

Thus, it will be understood that this invention is not limited to the constructions, designs and other details specifically described above and illustrated in the drawings, and can be carried out with the various modifications without departing from the scope of the invention as defined in the appended claims.

What is claimed is:

1. A view finder for photographic cameras including a picture-taking objective adjustable by turning to sharp focusing, having at its rear end a rearwardly facing stepped cam and marks on its peripheral surface, said marks being adjustable to a stationary mark provided on the camera casing, for indicating sharply focused positions of said objective at predetermined distances from the object; said finder being arranged within the cover cap of a camera and having a finder objective arranged in the front wall of said cap and a finder ocular aligned with the finder objective and arranged in the rear wall of the cover cap; a light-permeable frame provided in a light-impermeable mask arranged in said front wall of the cover cap; a mirror and a lens for deflecting light rays incident through said light-permeable frame, to the path of direct object viewing rays between the objective and ocular of the finder, and a semi-permeable mirror arranged in inclined position in said path of direct object-viewing rays, for further deflecting said light rays to the ocular of the view finder; a double-armed lever tiltably arranged about a first stationary pivot in the camera, carrying at one of its arms two colored sheets of different colors, arranged at an angle relative to each other and its other arm carrying a bolt; a two armed contact lever pivotally arranged about a second stationary pivot in the camera, one end of the contact lever having an elongated slot adapted to be engaged by said bolt and the other end of the contact lever having a contact piece; a spring for urging said contact lever to engage by its contact piece the rearwardly facing cam of the picture-taking objective, in order to cause tilting of the double-armed lever about said first stationary pivot over the steps of said stepped cam, elongated slot and bolt and alternately causing swinging of one of said colored sheets into the path of rays incident through the light-permeable frame, upon adjustment of the marks provided on the picture-taking objective to the stationary mark of the camera for indicating a sharp-focusing position of the objective at a distance associated with the color of the respective sheet.

2. A view finder for photographic cameras including a picture-taking objective adjustable by turning to sharp focusing, having on its peripheral surface a stepped radial cam and marks at its peripheral surface, said marks being adjustable to a stationary mark provided on the camera casing, for indicating sharply focused positions of said objective at predetermined distances from the object; said finder being arranged within the cover gap of a camera and having a finder objective arranged in the front wall of said cap and a finder ocular aligned with the finder objective and arranged in the rear wall of the cover cap; a light-permeable frame provided in a light-impermeable mask vertically displaceably arranged in the front wall of the cover cap, said mask having a light-permeable portion located within said light-permeable frame; a mirror and a lens for deflecting light rays incident through said light-permeable frame and said light-permeable portion of the mask, to the path of direct object viewing rays between the objective and ocular of the finder, and a semi-permeable mirror arranged in inclined position in said path of direct object-viewing rays, for further deflecting said light rays to the ocular of the view finder; a one-armed lever tiltably arranged about a stationary pivot of the camera and carrying at its free end two colored sheets of different colors arranged at an angle relative to each other; a contact member, the end portions of which are bent substantially in a right angle, one of said ends being fixedly connected with said mask, means for holding and guiding said contact member and a spring for urging the other end of the contact member to engage said steps of said radial cam in order to cause over the contact member vertical displacement of the mask in order to compensate for parallax upon adjusting the objective to distance, by turning; a control lever connected at one of its ends to said one-armed lever and at its other end to said contact member, for causing tilting of said contact lever about its pivot by action of the steps of the radial cam over the contact member and said control lever and alternately causing swinging of one of said colored sheets into the path of rays incident through the light-permeable parts of the mask, upon adjustment of the marks on the picture-taking objective to the stationary mark of the camera, for indicating a sharp-focusing position of the objective at a distance associated with the color of the respective sheet.

3. A view finder for photographic cameras including a picture-taking objective adjustable by turning to sharp focusing, and being provided with cam means for acting over transmission members on a tiltable member carrying two colored sheets of different color which form an angle with each other and are adapted to be alternately introduced into the field of vision of the view finder and with marks on the peripheral surface of the picture-taking objective, said marks being adjustable to a stationary mark provided on the camera body, for indicating sharply focused positions of said objective at predetermined distances from the object; said finder being arranged within the cover cap of a camera and having a finder objective arranged in the front wall of said cap and a finder ocular aligned with the finder objective and arranged in the rear wall of the cap; a light-impermeable mask arranged in said front wall and having at least one light-permeable portion; including at least a light-permeable frame, a mirror and a lens for deflecting light rays incident through the light-permeable portions of the mask, to the path of direct object viewing rays between the objective and ocular of the finder, and a semi-permeable mirror arranged in inclined position in said path of direct object-viewing rays, for further deflecting said light rays to the ocular of the view finder; transmission means connected at one end to said tiltable member and engaging at the other end under spring effect said cam means in order to cause tilting of said member and alternate swinging of one of said colored sheets into the path of rays incident through light-permeable portions of the frame, upon adjustment of the marks provided on the picture-taking objective, to the stationary mark of the camera, for indicating a sharp-focusing position of the objective at a distance associated with the color of the respective sheet.

References Cited in the file of this patent

UNITED STATES PATENTS

| 1,897,268 | Merle | Feb. 14, 1933 |
| 1,991,924 | Dolan | Feb. 19, 1935 |
| 2,153,132 | Crowther | Apr. 4, 1939 |
| 2,186,615 | Mihalyi | Jan. 9, 1940 |
| 2,191,045 | Slayton | Feb. 20, 1940 |
| 2,211,995 | Walker | Aug. 20, 1940 |
| 2,346,076 | Mihalyi | Apr. 4, 1944 |
| 2,616,343 | Donovan | Nov. 4, 1952 |
| 2,805,608 | Leitz et al. | Sept. 10, 1957 |

FOREIGN PATENTS

| 846,959 | France | June 19, 1939 |
| 1,110,905 | France | Oct. 19, 1955 |
| 180,816 | Austria | Jan. 25, 1955 |
| 571,645 | Great Britain | Sept. 2, 1945 |
| 725,018 | Great Britain | Mar. 2, 1955 |